US012544895B2

(12) United States Patent
Fujimoto et al.

(10) Patent No.: US 12,544,895 B2

(45) **Date of Patent: *Feb. 10, 2026**

(54) DRIVER, PRESSURE REGULATOR AND DRIVING UNIT

(71) Applicant: Koki Holdings Co., Ltd., Tokyo (JP)

(72) Inventors: Goya Fujimoto, Ibaraki (JP); Shinichirou Satou, Ibaraki (JP); Takashi Ueda, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,040

(22) Filed: Apr. 1, 2024

(65) Prior Publication Data

US 2024/0238954 A1 Jul. 18, 2024

Related U.S. Application Data

(63) Continuation of application No. 16/326,370, filed as application No. PCT/JP2017/027470 on Jul. 28, 2017, now Pat. No. 11,945,083.

(30) Foreign Application Priority Data

Aug. 31, 2016 (JP) ................................ 2016-169484

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC ................................ B25C 1/047; B25C 1/06
USPC .................................... 173/90; 227/107–156
See application file for complete search history.

(56) References Cited

U.S. PATENT DOCUMENTS

| | | | | |
|---|---|---|---|---|
| 3,633,459 A * | 1/1972 | Lange | B25C 1/041 | 91/401 |
| 3,850,359 A * | 11/1974 | Obergfell | B25C 1/08 | 60/632 |
| 4,196,833 A * | 4/1980 | Haytayan | B25C 7/00 | 173/15 |
| 5,720,423 A * | 2/1998 | Kondo | B25C 1/06 | 227/132 |
| 6,247,626 B1 * | 6/2001 | MacVicar | B25C 1/08 | 227/8 |
| 12,134,173 B2 * | 11/2024 | Hietpas | B25C 1/04 | |

(Continued)

FOREIGN PATENT DOCUMENTS

| | | | | |
|---|---|---|---|---|
| JP | 2014069289 A * | 4/2014 | B25C 1/06 | |
| TW | 200821102 A * | 5/2008 | B25C 1/06 | |

*Primary Examiner* — Robert F Long

(74) *Attorney, Agent, or Firm* — JCIPRNET

(57) ABSTRACT

Provided is a driver configured to be capable of filling gas suitable for a set pressure of a pressure chamber. This driver is provided with: a pressure chamber into which gas is filled; a striker moved in a first direction by pressure within the pressure chamber to strike nails; and an electric motor and a pin wheel, which move the striker in a second direction opposite to the first direction to increase the pressure within the pressure chamber. A pressure regulator for regulating the pressure of the gas filled into the pressure chamber is dedicated for the driver, and the driver is provided with a mounting hole for the pressure regulator.

20 Claims, 18 Drawing Sheets

(56) References Cited

U.S. PATENT DOCUMENTS

| | | | | |
|---|---|---|---|---|
| 2005/0001002 | A1* | 1/2005 | Schiestl | B25C 1/008 227/130 |
| 2005/0230451 | A1* | 10/2005 | Vanstaan | F17C 13/04 227/10 |
| 2005/0247750 | A1* | 11/2005 | Burkholder | B25C 1/04 227/130 |
| 2005/0252944 | A1* | 11/2005 | Patrick | B25C 1/04 227/8 |
| 2008/0210734 | A1* | 9/2008 | Uejima | B25C 1/003 227/129 |
| 2013/0082083 | A1* | 4/2013 | Largo | B25C 1/041 227/8 |
| 2016/0144496 | A1* | 5/2016 | Raggl | B25C 1/10 29/432 |
| 2016/0158819 | A1* | 6/2016 | Johnson | B25D 9/16 173/128 |
| 2016/0229043 | A1* | 8/2016 | Wyler | B25C 1/06 |
| 2018/0236646 | A1* | 8/2018 | Raggl | B25C 1/046 |
| 2018/0290279 | A1* | 10/2018 | Kobori | B25C 1/06 |
| 2021/0347023 | A1* | 11/2021 | Carrier | B25C 1/06 |
| 2022/0134525 | A1* | 5/2022 | Bandy | B25F 5/026 227/123 |
| 2023/0356376 | A1* | 11/2023 | Roubik | B25C 1/06 |

* cited by examiner

10 : driver
21 : pressure chamber
71 : pressure regulator
75 : mounting hole
D1 : first direction
D2 : second direction

DRIVER, PRESSURE REGULATOR AND DRIVING UNIT

CROSS-REFERENCE TO RELATED APPLICATION

This application is continuation application of U.S. application Ser. No. 16/326,370 filed on Feb. 18, 2019, which is a 371 application of the international PCT application serial no. PCT/JP2017/027470, filed on Jul. 28, 2017, which claims the priority benefit of Japan application no. 2016-169484, filed on Aug. 31, 2016. The entirety of each of the above-mentioned patent applications is hereby incorporated by reference herein and made a part of this specification.

BACKGROUND OF THE INVENTION

Technical Field

The disclosure relates to a driver, which moves a striker to increase pressure of a pressure chamber and moves the striker by the pressure of the pressure chamber, a pressure regulator and a driving unit.

Related Art

Conventionally, a driver is known which fills a sealed pressure chamber with air or inert gas that acts as a gas and moves a striker by pressure of the gas, and the driver is recited in patent literature 1. The driver includes a cylinder arranged within a housing, a closing wall arranged on the cylinder, a piston movably accommodated within the cylinder, a driver blade fixed to the piston, a pressure chamber formed within the cylinder, and a gas filling valve arranged on the closing wall. Compressed gas is filled from a nitrogen gas bomb provided outside the housing, through a gas hose and introducing gas filling valve into the pressure chamber. A sealing member is interposed between the cylinder and the piston, and the sealing member maintains an airtightness of the pressure chamber.

The piston and the driver blade are strikers. In addition, the driver includes a motor arranged within the housing, a gear train to which a rotating force is transmitted from the motor, and a cam which is rotated by the rotating force transmitted from the gear train. The cam has a protrusion, and the protrusion can be engaged with and separated from the piston.

In the driver recited in patent literature 1, the rotating force of the motor is transmitted through the gear train to the cam. When the protrusion is engaged with the piston, the piston moves from a bottom dead centre to a top dead centre by the power of the cam. When the piston moves from the bottom dead centre toward the top dead centre, the pressure of the pressure chamber increases. When the piston reaches the top dead centre, the protrusion is separated from the piston, and the power of the cam is not transmitted to the piston. Then, the striker moves under the pressure of the pressure chamber, and the driver blade drives a nail into a target.

LITERATURE OF RELATED ART

Patent Literature

Patent literature 1: Japanese Patent No. 5849920

SUMMARY

Problems to be Solved

However, there is a problem in the driver recited in patent literature 1, that is, when the compressed gas is replenished from a gas replenishing valve to the pressure chamber, it takes time to adjust the gas filling that meets a predefined set pressure.

The disclosure aims to provide a driver that can easily fill the gas suitable for the set pressure of the pressure chamber, a pressure regulator and a driving unit.

Means to Solve the Problems

The driver of one embodiment includes: a pressure chamber into which gas is filled; a striker that strikes a stopper by moving in a first direction by pressure of the pressure chamber; and a moving mechanism that moves the striker in a second direction opposite to the first direction to increase the pressure of the pressure chamber; wherein a pressure regulator for regulating the pressure of the gas filled into the pressure chamber is mountable to and demountable from the driver, and the driver is provided with a mounting portion dedicated for the pressure regulator.

Effect

The driver of one embodiment can fill the gas suitable for the set pressure of the pressure chamber.

DESCRIPTION OF THE EMBODIMENTS

Next, embodiments of a driving unit are described with reference to drawings. The same symbols are attached to common components in each drawing.

Figure 1:
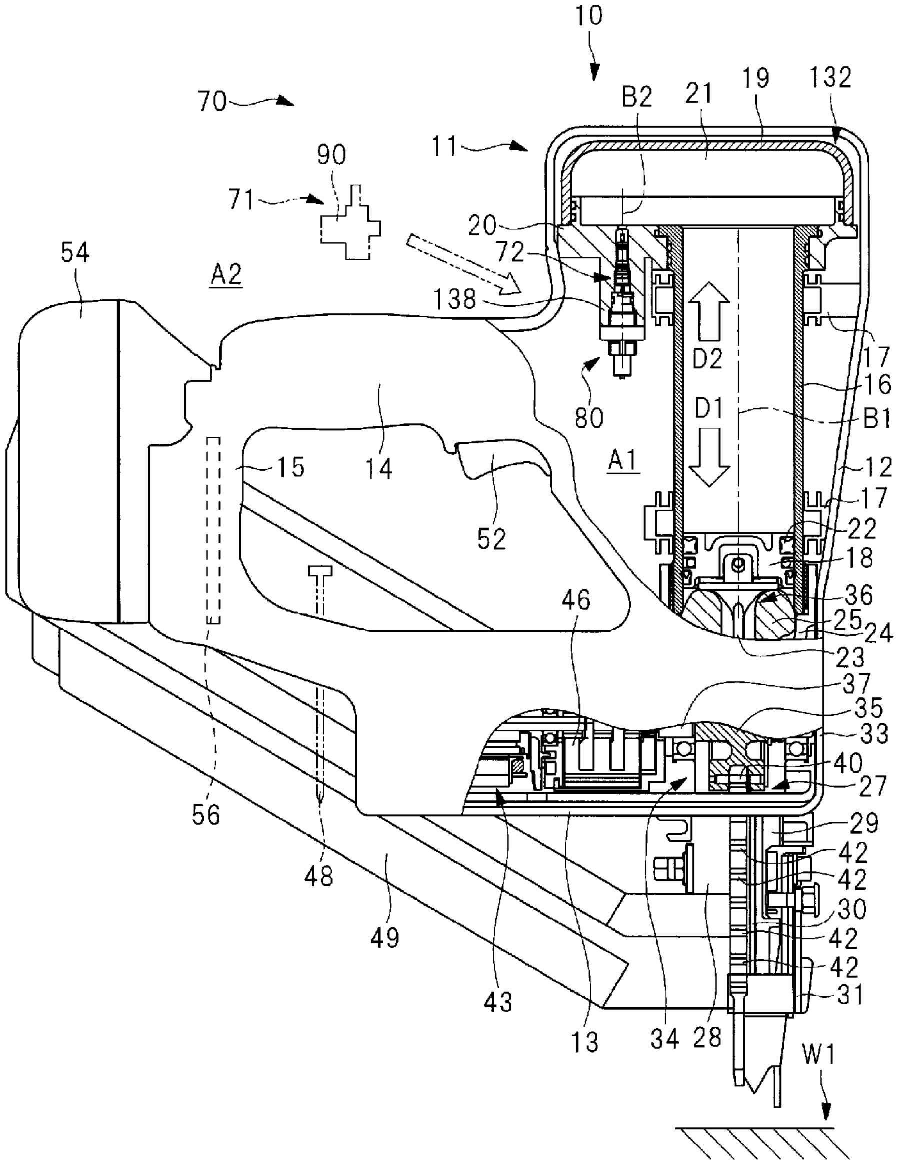
FIG. 1 is a cross-section view of a driver used in a driving unit which is one embodiment of the present invention.

A driving unit 70 shown in FIG. 1 has a driver 10 and a pressure regulator 71. The driver 10 has a housing 11, and the housing 11 has a cylinder case 12, a motor case portion 13 which is continuous with the cylinder case 12, a handle portion 14 which is continuous with the cylinder case 12, and a mounting portion 15. The mounting portion 15 is continuous with the handle portion 14 and the motor case portion 13.

A cylinder 16 is provided within the cylinder case 12. A holder 17 is provided within the cylinder case 12, and the cylinder 16 is positioned in a radial direction by the holder 17. In addition, a piston 18 is movably disposed within the cylinder 16. A movement direction of the piston 18 is a direction of a central line B1 of the cylinder 16.

A pressure accumulation container 132 is provided within the cylinder case 12. The pressure accumulation container 132 has a main body 19 with a cap shape and a base portion 20 that is mounted to an opening portion of the main body 19. The base portion 20 is circular, and the base portion 20 is mounted to an outer periphery of the cylinder 16. The base portion 20 is made of metal or synthetic resin. A pressure chamber 21 is formed by the pressure accumulation container 132.

A sealing member 22 is mounted on an outer peripheral surface of the piston 18, and the sealing member 22 airtightly seals the pressure chamber 21. Compressible gas is filled in the pressure chamber 21. In addition to air, the gas filled into the pressure chamber 21 can also be inert gas, for example, nitrogen gas and rare gas. In the disclosure, an example of filling air to the pressure chamber 21 is described. A driver blade 23 is mounted on the piston 18. A striker 36 is configured by the piston 18 and the driver blade 23. The striker 36 is capable of moving in a first direction D1 under the pressure of the pressure chamber 21.

A holder 24 is provided within the housing 11, and the cylinder 16 is positioned in the direction of the central line B1 by the holder 24. The holder 24 is disposed, in the direction of the central line B1 of the cylinder 16, in a place opposite to the place where the base portion 20 is disposed. The holder 24 supports a bumper 25, and the bumper 25 is integrally formed by a rubber-like elastic body. When the driver blade 23 collides with the bumper 25, the bumper 25 attenuates and reduces a shock load from the driver blade 23.

An injection portion 27 is mounted to the holder 24. The injection portion 27 is disposed over an exterior A2 of the housing 11 from inside the housing 11. The injection portion 27 has a blade guide 28 and a cover 29 fixed to the blade guide 28. An injection path 30 is formed between the blade guide 28 and the cover 29. The injection path 30 is a guide hole disposed along the direction of the central line B1. The driver blade 23 is capable of reciprocating in the direction of the central line B1 within the injection path 30. The driver blade 23 is disposed over the injection path 30 from inside the cylinder 16.

A pushrod 31 is mounted on the blade guide 28. The pushrod 31 is disposed in the exterior A2 of the housing 11, and is movable with respect to the blade guide 28 in the direction of the central line B1. A front end of the pushrod 31 is pressed toward a driven material W1. The pushrod 31 is energized by a force of a compressed coil spring in a direction away from the bumper 25.

An accommodation portion 33 that is continuous with the cylinder case 12 and the motor case portion 13 is provided. A moving mechanism 34 is disposed within the accommodation portion 33. The moving mechanism 34 moves the striker 36 in a second direction D2 in a direction approaching the pressure chamber 21 against the pressure of the pressure chamber 21. The moving mechanism 34 has a pin wheel 35 and a driving shaft 37. The pin wheel 35 is fixed to the driving shaft 37. A plurality of pinions 40 are provided along a rotation direction of the pin wheel 35.

On the other hand, a plurality of convex portions 42 is provided along the direction of the central line B1 on a side edge of the driver blade 23. The plurality of pinions 40 and the plurality of convex portions 42 can be individually engaged and released respectively.

An electric motor 43 is provided within the motor case portion 13. The electric motor has a stator and a rotor. A decelerator 46 is provided within the motor case portion 13. The rotor is connected to the decelerator. A rotating force of the electric motor 43 is transmitted through the decelerator 46 to the driving shaft 37.

A rotation restricting mechanism is provided within the motor case portion 13. The rotation restricting mechanism has a function of transmitting the rotating force of the decelerator 46 to the pin wheel 35. The rotation restricting mechanism has a function of preventing the pin wheel 35 from rotating when the force of the pressure chamber 21 is transmitted through the piston 18 and the driver blade 23 to the pin wheel 35. An inverter circuit is provided inside a motor case. The inverter circuit has a plurality of switching elements, and the plurality of switching elements can be turned on and off respectively. The inverter circuit is connected to the stator of the electric motor 43.

A magazine 49 which accommodates a plurality of stoppers 48 is provided, and the magazine 49 is fixed to the housing 11 and the blade guide 28. The magazine 49 has a feeding mechanism, and the feeding mechanism supplies the stoppers 48 in the magazine 49 to the injection path 30. The stoppers 48 are shaft-shaped nails.

A pressing sensor and a rotation angle sensor are provided on the injection portion 27. The pressing sensor is turned on when the pushrod 31 is pressed toward the driven material W1, and is turned off when the pushrod 31 is separated from the driven material W1. The rotation angle sensor detects a rotation angle of the pin wheel 35 and outputs signals.

An operator grasps the handle portion 14 by hands. A trigger 52 and a trigger switch are provided on the handle portion 14. The trigger switch is turned on when an operation force is applied to the trigger 52, and is turned off when the operation force is not applied to the trigger 52.

A battery 54 is mounted to the mounting portion 15. The battery 54 is mountable to and demountable from the mounting portion 15. The battery 54 supplies electric power to the electric motor 43. The battery 54 has an accommodation case, and a plurality of battery cells accommodated within the accommodation case. The battery cells include secondary batteries, for example, lithium-ion batteries, nickel hydrogen batteries, lithium-ion polymer batteries and nickel cadmium batteries. That is, the battery 54 is a direct-current power source.

A control substrate 56 is provided within the mounting portion 15. A controller and an electric circuit are provided on the control substrate 56. Signals of the pressing sensor, signals of the rotation angle sensor and signals of the trigger switch are input to the controller. The controller outputs signals that controls the inverter circuit.

Next, a control example and a usage example of the driver 10 are described. The controller stops the electric motor 43 when the pressing sensor is turned off and the trigger switch is turned off. The striker 36 is energized toward the bumper 25 by the air pressure of the pressure chamber 21. In addition, the pinions 40 are engaged with the convex portions 42, and energizing force received by the striker 36 is transmitted to the pin wheel 35. When the rotating force is applied to the pin wheel 35 by the pressure of the pressure chamber 21, the rotation restricting mechanism prevents the pin wheel 35 from rotating. Therefore, the striker 36 stops in a position where the driver blade 23 is separated from the bumper 25. That is, the striker 36 stops in a stand-by position.

The controller rotates the electric motor 43 when the pressing sensor is turned on and the trigger switch is turned on. The rotating force of the electric motor 43 is transmitted through the decelerator 46 to the pin wheel 35, and the pin wheel 35 is rotated. A rotating force of the pin wheel 35 is transmitted to the striker 36 through the pinions 40 and the convex portions 42, the striker 36 moves from the stand-by position toward a top dead centre in the second direction D2, and the air pressure of the pressure chamber 21 increases.

After the striker 36 reaches the top dead centre, the pinions 40 are released from the convex portions 42. The top dead centre of the striker 36 is a position where the piston 18 is closest to the pressure chamber 21 in the direction of the central line B1. When the pinions 40 are released from the convex portions 42, the striker 36 moves toward a bottom dead centre in the first direction D1 under the pressure of the pressure chamber 21. Besides, the driver blade 23 strikes the stoppers 48 in the injection path 30, and the stoppers 48 are driven into the driven material W1.

In addition, when the driver blade 23 drives the stoppers 48 into the driven material W1, the driver blade 23 collides with the bumper 25, and one portion of kinetic energy of the striker 36 is absorbed by the bumper 25. At the time when the driver blade 23 collides with the bumper 25, the position of the striker 36 in the direction of the central line B1 is the bottom dead centre.

The controller continues the rotation of the electric motor 43 even after the driver blade 23 strikes the stoppers 48. Therefore, the pinions 40 are engaged with the convex portions 42, and the striker 36 moves from the bottom dead centre toward the top dead centre in the second direction D2. The controller stops the electric motor 43 at the time when the striker 36 reaches the stand-by position from the bottom dead centre. The controller can determine a timing to stop the electric motor 43 from the rotation angle of the pin wheel 35.

A mechanism that maintains and adjusts the pressure of the pressure chamber 21 is described. A set pressure, which is target pressure of the pressure chamber 21, is set corresponding to a target driving force of the driver 10. The target driving force is defined by application conditions of the driver 10, for example, lengths of the stoppers 48 and hardness of the driven material W1. Besides, the air is filled into the pressure chamber 21 in a manner that the pressure of the pressure chamber 21 becomes the set pressure.

Figure 2:
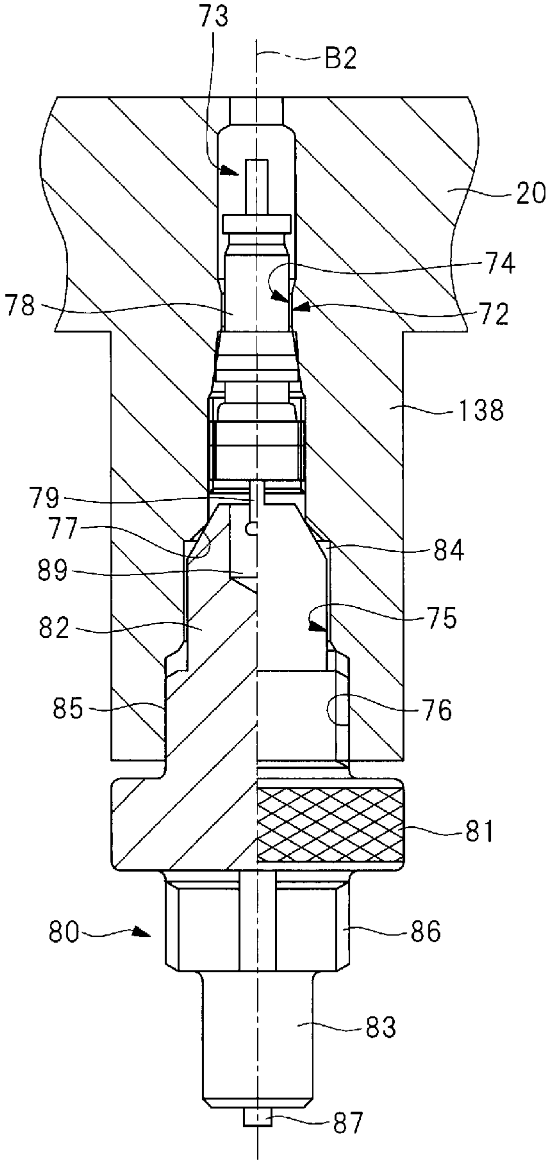
FIG. 2 is a cross-section view showing an example of a cap mountable to and demountable from the driver.
Figure 3:
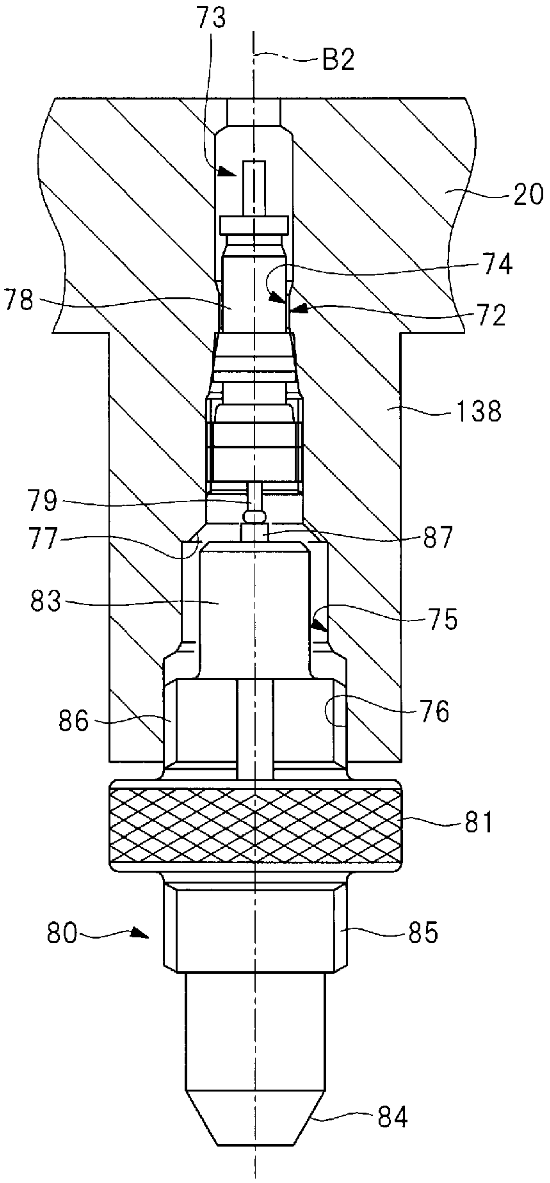
FIG. 3 is a cross-section view showing an example of the cap mountable to and demountable from the driver.

As shown in FIG. 2 and FIG. 3, a sleeve 138 which projects from the base portion 20 is arranged, and a holding hole 73 is formed by the sleeve 138. The sleeve 138 is one portion of the base portion 20. The holding hole 73 penetrates the base portion 20 in a direction of a central line B2. The central line B2 is parallel to the central line B1. The holding hole 73 is linked with the pressure chamber 21. The holding hole 73 has a valve accommodation portion 74 and a mounting hole 75. The valve accommodation portion 74 is disposed between the pressure chamber 21 and the mounting hole 75 in the direction of the central line B2. The mounting hole 75 has a female thread portion 76 and a taper portion 77. The taper portion 77 is disposed between the female thread portion 76 and the valve accommodation portion 74 in the direction of the central line B2. The taper portion 77 is an inclined surface circularly formed centering on the centre line B2. The taper portion 77 inclines in a direction in which an inner diameter decreases as the taper portion 77 approaches the valve accommodation portion 74.

A valve 72 is disposed within the valve accommodation portion 74. The valve 72 has a cylindrical valve core 78 which has a port, a valve body 79 which is movable with respect to the valve core 78 and opens and closes the port, and an elastic member which energizes the valve body 79. An outer peripheral surface of the valve core 78 is pressed to an inner surface of the valve accommodation portion 74 to form a sealing surface. Therefore, compressed air inside the pressure chamber 21 does not leak from a clearance between the valve core 78 and the inner surface of the valve accommodation portion 74 to the valve accommodation portion 74. One portion of the valve body 79 is disposed outside the valve core 78.

The port of the valve 72 is opened when an external force is applied to the valve body 79, and the pressure chamber 21 and the mounting hole 75 are connected. The valve 72 closes the port when the external force is not applied to the valve body 79, and disconnects the pressure chamber 21 and the mounting hole 75. When the driver 10 is used, the valve 72 is shut, and the pressure of the pressure chamber 21 is maintained at the set pressure.

A cap 80 which is mountable to and demountable from the base portion 20 is provided. The cap 80 has a knob portion 81 and a connecting portion 82 and a connecting portion 83 which are provide on both sides of the knob portion 81. The operator can grasp the knob portion 81 with fingers to rotate the cap 80. An outer diameter of the connecting portion 82 is a value by which the connecting portion 82 can be inserted into the mounting hole 75. A concave portion 89 is formed in a front end of the connecting portion 82.

A taper portion 84 is provided on the connecting portion 82. The taper portion 84 is an inclined surface circularly formed centering on the central line B2. The connecting portion 82 has a male thread portion 85, and the male thread portion 85 can be inserted into the female thread portion 76. The taper portion 84 inclines in a direction in which an inner diameter decreases as the taper portion 84 is away from the male thread portion 85. A male thread portion 86 is provided on an outer periphery of the connecting portion 83, and a protrusion 87 is provided at a front end of the connecting portion 83.

When the pressure of the pressure chamber 21 is above the set pressure, the cap 80 is fixed to the base portion 20. That is, as shown in FIG. 2, the connecting portion 82 is inserted into the mounting hole 75, and the male thread portion 85 is screwed and tightened to the female thread portion 76. When the cap 80 is fixed to the base portion 20 in a first state shown in FIG. 2, the taper portion 84 of the connecting portion 82 is pressed to the taper portion 77 of the base portion 20, and a sealing surface is formed. In addition, a front end of the valve body 79 is positioned within the concave portion 89, and the valve body 79 is not subject to external force. Therefore, the valve 72 disconnects the pressure chamber 21 and the mounting hole 75.

Next, an operation example of drawing out the compressed air from the pressure chamber 21 is described. The operator grasps the knob portion 81 to make the cap 80 rotate reversely, and demounts the cap 80 from the base portion 20. Besides, when the connecting portion 83 is inserted into the mounting hole 75 and the cap 80 is rotated, as shown in FIG. 3, the male thread portion 86 is screwed into the female thread portion 76, and the cap 80 is fixed to the base portion 20 in a second state. Then, the protrusion 87 of the connecting portion 83 is pressed to the valve body 79, the valve body 79 moves, and the valve 72 connects the pressure chamber 21 and the mounting hole 75. Therefore, the air in the pressure chamber 21 passes through the mounting hole 75, and is discharged to an interior A1 of the housing 11 shown in FIG. 1.

Figure 4:
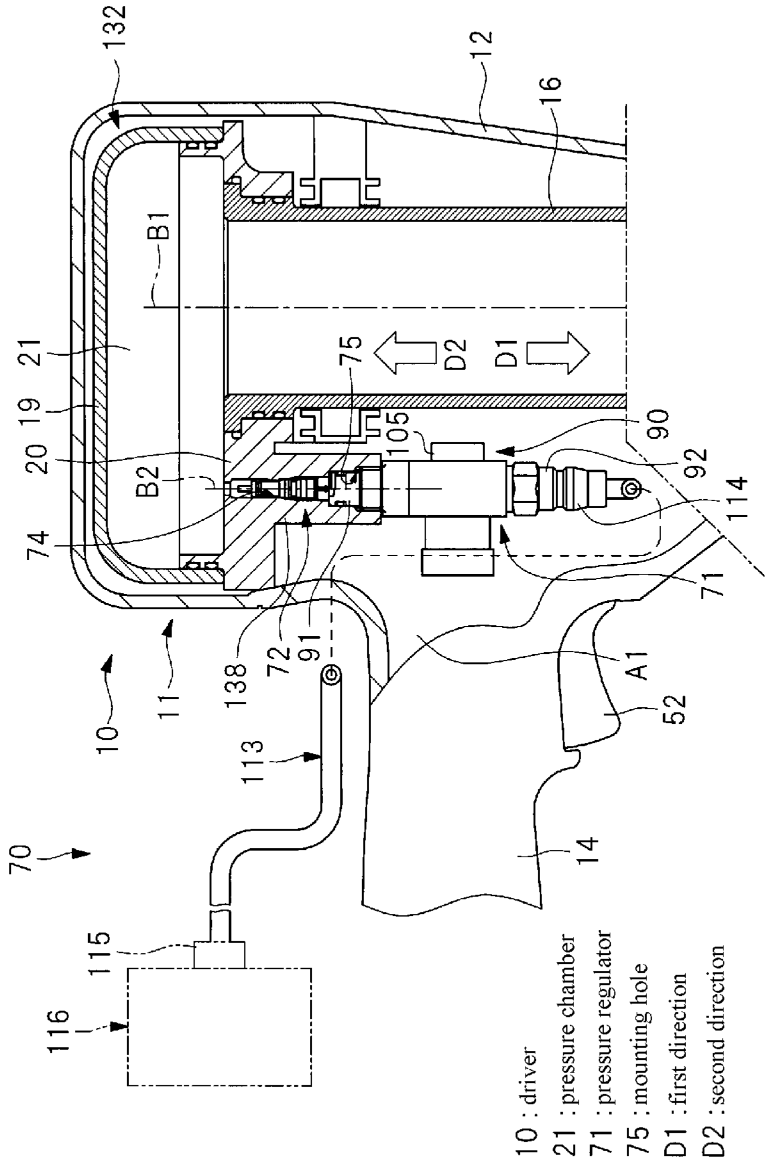
FIG. 4 is a partial cross-sectional side view of the driver.

The pressure regulator 71 is used when the compressed air is injected into the pressure chamber 21. In a state that the operator demounts the cap 80 from the base portion 20, as shown in FIG. 4, the pressure regulator 71 can be mounted to the base portion 20.

(Embodiment 1) Embodiment 1 of the pressure regulator 71 is described with reference to FIG. 5, FIG. 6, FIG. 7, and FIG. 8.

The pressure regulator 71 has a main body portion 90, connecting portions 91, 92 projecting from the main body portion 90, a gas chamber 93 formed in the main body portion 90, a passage 94 which penetrates the main body portion 90 to be connected to the gas chamber 93, a passage 95 provided in the connecting portion 91, a passage 96 provided in the connecting portion 92, and a port 97 which connects the passage 95 and the passage 96. The pressure regulator 71 has a piston 98 which is mounted movably with respect to the main body portion 90, a valve seat 99 which forms the port 97, a space 100 provide between the valve seat 99 and the piston 9, a port 101 provided in the piston 98, and a valve body 102 which is movable with respect to the main body portion 90. The port 101 connects the space 100 and the gas chamber 93, and the valve body 102 opens and closes the ports 97, 101.

In addition, the pressure regulator 71 has a spring bearing 103 and a main spring 104. The gas chamber 93 is formed between the piston 98 and the spring bearing 103. The main spring 104 is disposed in the gas chamber 93. A male thread portion 118 is provided on an outer peripheral surface of the spring bearing 103. A female thread portion 119 is provided on an inner surface of the main body portion 90, and the male thread portion 118 is screwed into the female thread portion 119. In addition, the pressure regulator 71 has a spring bearing 105 mounted to the main body portion 90, and a spring 106 disposed between the valve body 102 and the spring bearing 105. The main spring 104 and the spring 106 are compression springs.

The connecting portion 91 has an outer diameter which can be inserted into the mounting hole 75, and a male thread portion 107 is provided on an outer peripheral surface of the connecting portion 91. A sealing member 108 is mounted on the outer peripheral surface of the connecting portion 91. A pushrod 117 is provided in the passage 95 in the connecting portion 91. A sealing member 109 is mounted on an outer peripheral surface of the piston 98, and the sealing member 109 disconnects the gas chamber 93 and the space 100. The valve body 102 has a pressure receiving surface 110. A sealing member 111 is mounted on an outer peripheral surface of the valve body 102, and the sealing member 111 contacts the spring bearing 105 and forms a sealing surface.

In one embodiment, the pressure regulating portion 21 includes a first passage 96 to which the gas is supplied from outside, a second passage 95 connected to the pressure chamber 21, a third passage 94 which discharges the gas from the second passage, and a valve body 98 which connects and disconnects the first passage 96 and the second passage 95, and connects and disconnects the second passage and the third passage 94. The valve body 98 connects the first passage 96 and the second passage 95 and disconnects the second passage 95 and the third passage 94 when a pressure of the pressure chamber 21 is below a target pressure of the pressure chamber 21, and disconnects the first passage 96 and the second passage 95 and connects the second passage 95 and the third passage 94 when the pressure of the pressure chamber 21 exceeds the target pressure of the pressure chamber 21.

A pressure regulating portion 112 is configured by the main body portion 90, the piston 98, the valve body 102, the main spring 104 and the spring 106. The main body portion 90, the connecting portion 91 and the connecting portion 92 are integrated. The main body portion 90, the connecting portion 91 and the connecting portion 92 are made of synthetic resin or metal. A coupler 114 provided at a first end portion of an air hose 113 is mountable to and demountable from the connecting portion 92, and a coupler 115 provided at a second end portion of the air hose 113 is connected to a compressor 116.

Figure 5:
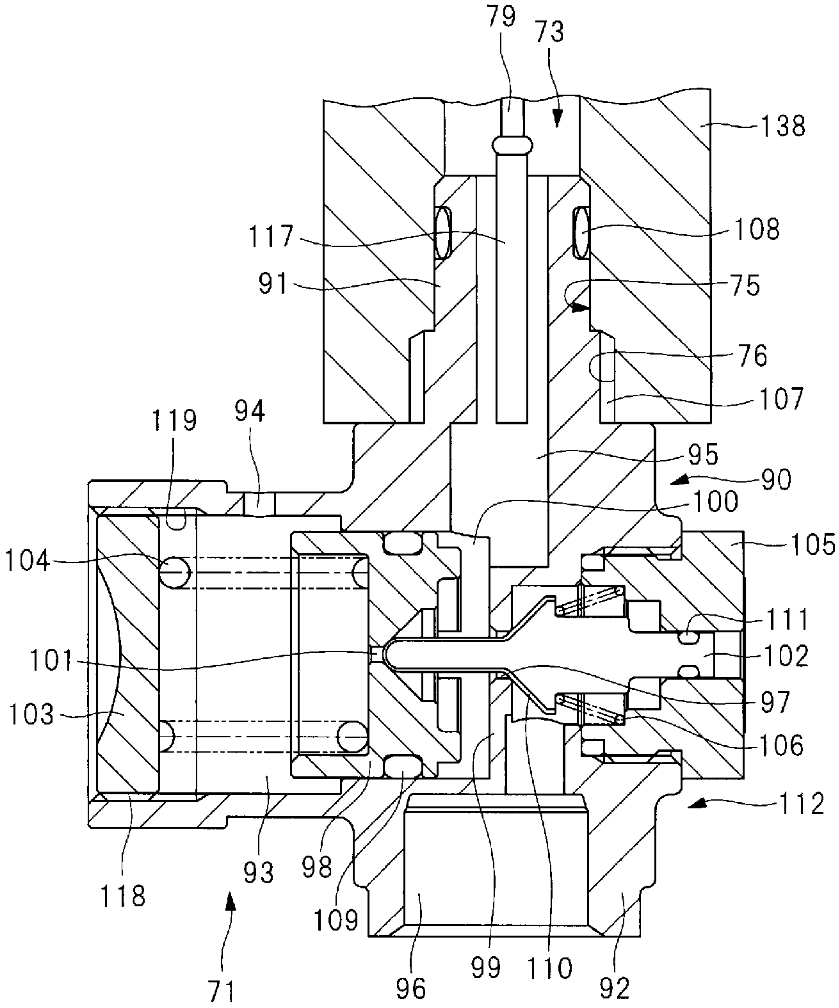
FIG. 5 is a cross-section view showing embodiment 1 of a pressure regulator.

The operator can mount the pressure regulator 71 to the base portion 20 in a state that the cap 80 is demounted from the sleeve 138. When the connecting portion 91 is inserted into the mounting hole 75 and the male thread portion 107 is screwed and tightened to the female thread portion 76, as shown in FIG. 5, the pressure regulator 71 is fixed to the sleeve 138. As shown in FIG. 4, when the pressure regulator 71 is mounted to the sleeve 138, the pressure regulator 71 is disposed in the interior A1 of the housing 11. Herein, the interior A1 of the housing 11 is outside the cylinder 16 and outside the pressure accumulation container 132. FIG. 4 shows an example that the pressure regulator 71 is disposed between the cylinder 16 and the handle portion 14.

A process of filling the compressed air into the pressure chamber 21 is as follows. When the pressure regulator 71 is mounted to the sleeve 138, the pushrod 117 pushes the valve body 79, and the valve 72 connects the pressure chamber 21 and the passage 96.

When pressure of the passage 96 is set as Pi, the pressure of the pressure chamber 21 is set as Po, and the set pressure which is the target pressure of the pressure chamber 21 is set as Pa, if the condition of numerical formula 1 is satisfied, the compressed air is filled to the pressure chamber 21.

$$Pi = Po < Pa \quad \text{numerical formula 1}$$

FIG. 5 shows an initial state of the pressure regulator 71 when a relationship of the numerical formula 1 is set up. The valve body 102 is pressed to the valve seat 99 by an energizing force of the spring 106 and stops, and the valve body 102 closes the port 97. That is, the port 97 and the passage 95 are disconnected. In addition, the piston 98 which is energized by the main spring 104 touches a front end of the valve body 102 and stops, and the front end of the valve body 102 closes the port 101. That is, the passage 95 and the gas chamber 93 are disconnected.

When the compressed air is filled into the pressure chamber 21, the pressure Pi of the compressed air that is spouted from the compressor 116 is set to be higher than the set pressure Pa. That is, the condition of numerical formula 2 is satisfied.

$$Pi > Pa > Po \qquad \text{numerical formula 2}$$

Figure 6:
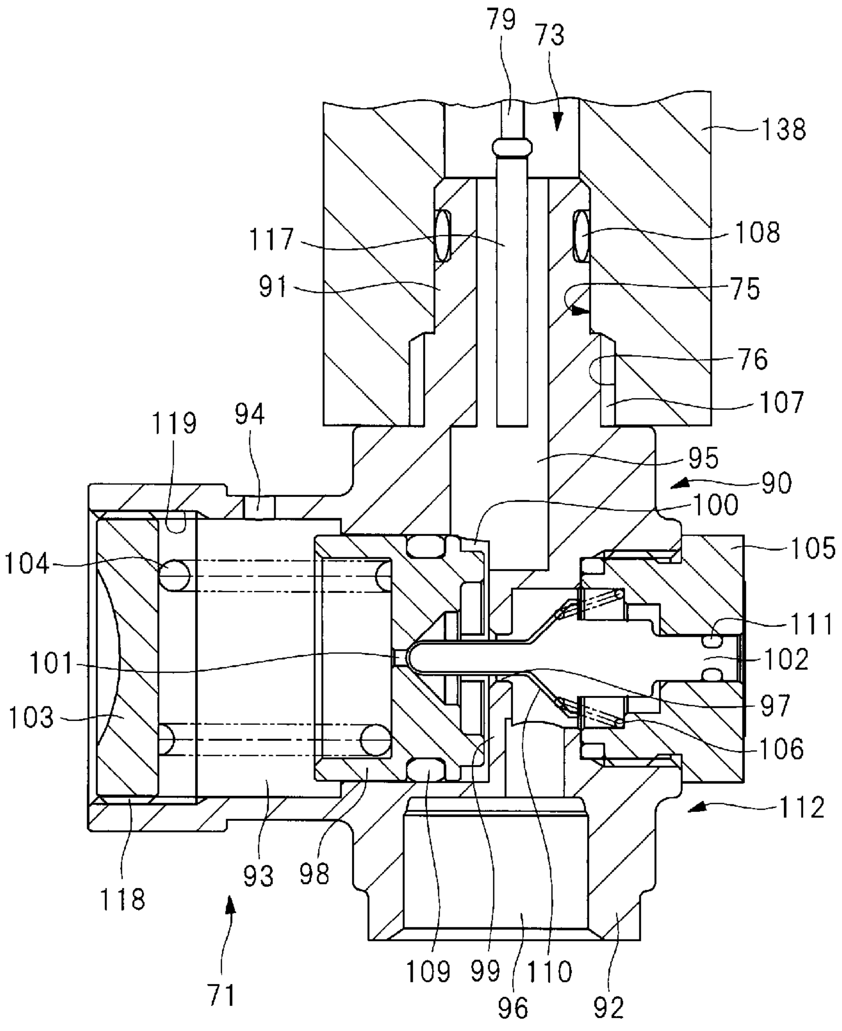
FIG. 6 is a cross-section view showing an operation example of the pressure regulator in FIG. 5.

The pressure receiving surface 110 of the valve body 102 of the pressure regulator 71 is subject to air pressure of the passage 96, and when the condition of the numerical formula 2 is satisfied, the valve body 102 moves as shown in FIG. 6, against the energizing force of the spring 106, in a direction in which the pressure receiving surface 110 is away from the valve seat 99. When the valve body 102 moves, the port 97 is opened, and the passage 96 and the passage 95 are connected. Therefore, the compressed air which is supplied from the compressor 116 to the passage 96 is filled through the port 97 and the passage 95 into the pressure chamber 21. In addition, the piston 98 is maintained at a state of touching the front end of the valve body 102, and approaches the valve seat 99 under an energizing force of the main spring 104. Therefore, the port 101 is maintained at a state of being blocked. The pressure Po of the pressure chamber 21 is increased due to such an action.

Figure 7:
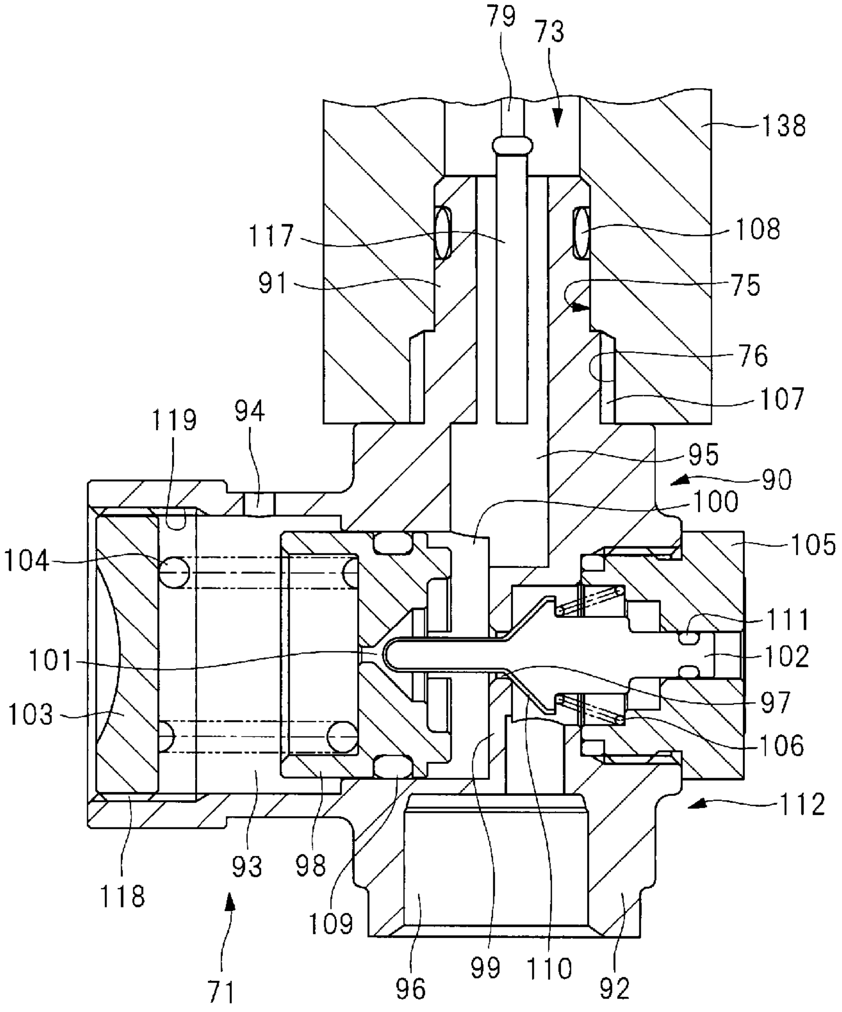
FIG. 7 is a cross-section view showing an operation example of the pressure regulator in FIG. 5.

When the pressure Po of the pressure chamber 21 exceeds the set pressure Pa, the piston 98 moves in a direction away from the valve seat 99 against the energizing force of the main spring 104. Then, as shown in FIG. 7, the port 101 of the pressure regulator 71 is opened, and the compressed air of the pressure chamber 21 is discharged to the interior A1 of the housing 11 through the space 100, the port 101, the gas chamber 93 and the passage 94.

In this way, the compressed air of the pressure chamber 21 is discharged from the passage 94, and the pressure Po of the pressure chamber 21 is equal to the set pressure Pa. Furthermore, the pressure of the passage 96 decreases, the valve body 102 moves under the energizing force of the spring 106 in a direction in which the pressure receiving surface 110 approaches the valve seat 99, and the valve body 102 closes the port 97.

Figure 8:
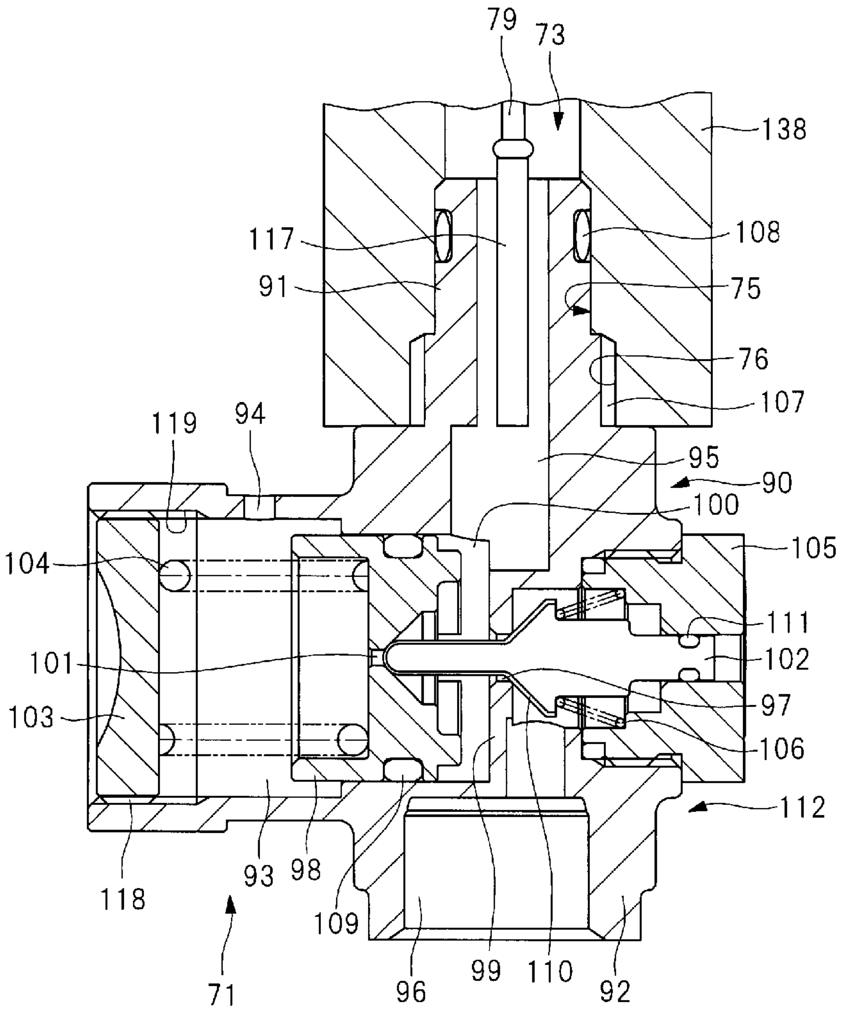
FIG. 8 is a cross-section view showing an operation example of the pressure regulator in FIG. 5.

When the pressure Po of the pressure chamber 21 is equal to the set pressure Pa, the piston 98 moves in a direction approaching the valve seat 99 under the energizing force of the main spring 104, and as shown in FIG. 8, the piston 98 touches the front end of the valve body 102, and the piston 98 stops. When the pressure regulator 71 is in the state of FIG. 8, the condition of numerical formula 3 is satisfied.

$$Pi > Po = Pa \qquad \text{numerical formula 3}$$

When the operation of filling the compressed air into the pressure chamber 21 is completed, the operator makes the pressure regulator 71 rotate to demount the pressure regulator 71 from the sleeve 138, and mounts the cap 80 to the sleeve 138 as shown in FIG. 2.

When the operator rotates the spring bearing 103, the pressure regulator 71 can adjust an energizing force applied to the piston 98 from the main spring 104. When the energizing force applied to the piston 98 from the main spring 104 is changed, the pressure of the pressure chamber 21 by which the port 101 is opened and closed, that is, the set pressure Pa can be changed. That is, the pressure regulator 71 is a dedicated device for setting the pressure Po of the pressure chamber 21 to the set pressure Pa. The pressure regulator 71 can be understood as a pressure regulating valve, or a pressure reducing valve.

The base portion 20 of the driver 10 can mount and demount the pressure regulator 71, and has a dedicated structure for mounting the pressure regulator 71. In other words, the pressure regulator 71 is mountable to and demountable from the base portion 20, and has a dedicated structure for being mounted to the base portion 20.

The dedicated structure of the base portion 20 includes an inner diameter of the mounting hole 75, an inner diameter of the female thread portion 76, pitches of the female thread portion 76, and an inclination direction of the female thread portion 76 and so on. The dedicated structure of the pressure regulator 71 includes the outer diameter of the connecting portion 91, an outer diameter of the male thread portion 107, pitches of the male thread portion 107, an inclination direction of the male thread portion 107 and so on. Therefore, only the dedicated pressure regulator 71, which adjusts the pressure Po of the pressure chamber 21 to the set pressure Pa, can be mounted to the base portion 20. Therefore, the pressure Po of the pressure chamber 21 can be reliably set to the set pressure Pa.

The pressure regulator 71 is disposed in the exterior A2 of the housing 11, and the pressure regulator 71 is disposed in the interior A1 of the housing 11 only when the compressed air is filled into the pressure chamber 21. Therefore, the housing 11 can be suppressed from being relatively large, and the weight of the driver 10 can be suppressed from increasing. In addition, vibration at the time of striking the stoppers 48 by the driver 10 is not transmitted to the pressure regulator 71.

Furthermore, the connecting portion 92 can also be set as a dedicated structure, and the air hose, the compressor, the gas bomb and the like which are connected to the connecting portion 92 can also be set as dedicated structures.

Figure 9:
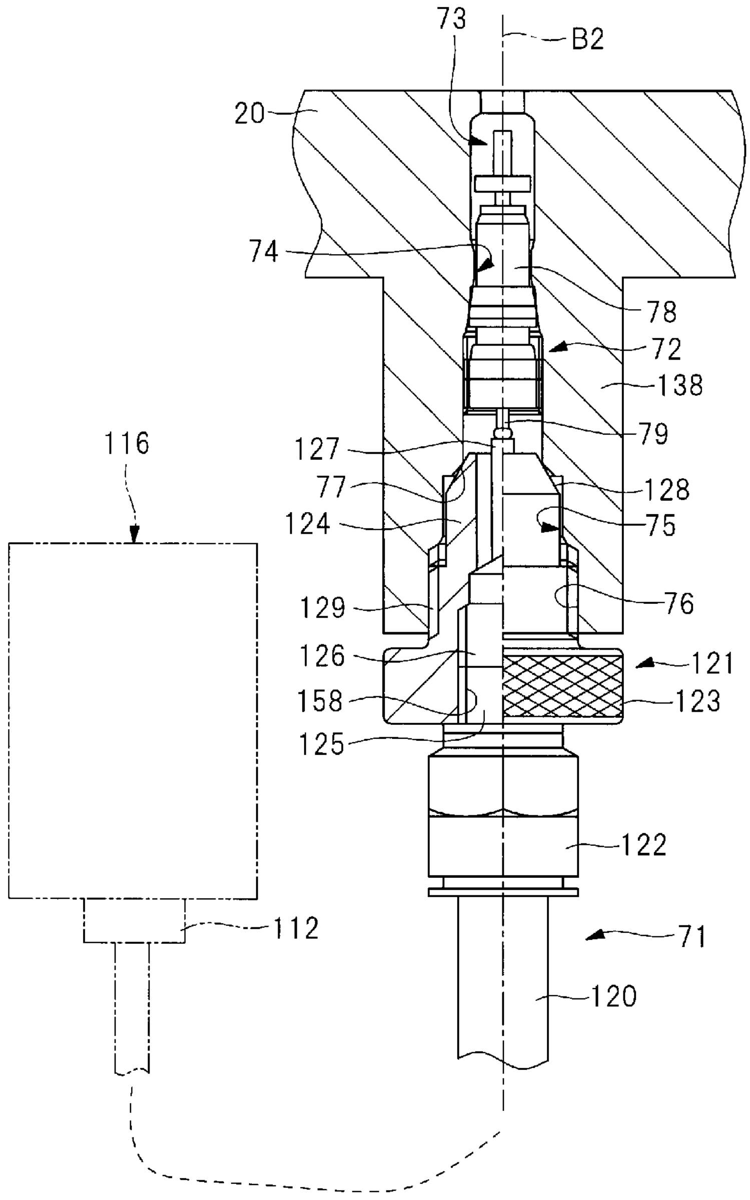
FIG. 9 is a cross-section view showing embodiment 2 of the pressure regulator.

(Embodiment 2) Embodiment 2 of the pressure regulator 71 is described with reference to FIG. 9. The pressure regulator 71 shown in FIG. 9 has the pressure regulating portion 112, an air hose 120 and a charge adapter 121. The pressure regulating portion 112 is disposed in the exterior A2 of the housing 11 shown in FIG. 1, and the pressure regulating portion 112 is connected to the compressor 116. The charge adapter 121 is mountable to and demountable from the sleeve 138 of the base portion 20. The charge adapter 121 is provided separately from the pressure regulating portion 112. A coupler 122 is provided in the air hose 120, and the coupler 122 has a male thread portion 125.

The charge adapter 121 is in a cylindrical shape, and the charge adapter 121 has a knob portion 123, and a connecting portion 124 connected to the knob portion 123. An outer diameter of the connecting portion 124 is a value by which the connecting portion 124 can be inserted into the mounting hole 75. The charge adapter 121 has a passage 126, and a female thread portion 158 is provided on an inner surface of the passage 126. The male thread portion 125 is screwed into the female thread portion 158, and the coupler 122 is fixed to the charge adapter 121. The passage 126 is linked with the valve 72 and the interior of the air hose 120. A pushrod 127 which projects from the passage 126 is provided.

A taper portion 128 is provided on an outer peripheral surface of the connecting portion 124. The taper portion 128 is an inclined surface circularly formed centering on the central line B2. The connecting portion 124 has a male thread portion 129, and the male thread portion 129 is screwed into the female thread portion 76. The taper portion 128 inclines in a direction in which an inner diameter decreases as the taper portion 128 is away from the male thread portion 129.

An operation of mounting the charge adapter 121 to the sleeve 138 in a state that the cap 80 is demounted from the base portion 20 is described. First, when the connecting portion 124 is inserted into the mounting hole 75 and the charge adapter 121 is rotated, the male thread portion 129 is screwed and tightened to the female thread portion 76. When the charge adapter 121 is fixed to the sleeve 138, the taper portion 128 of the connecting portion 124 is pressed to the taper portion 77 of the sleeve 138 to form a sealing surface. In addition, the pushrod 127 is pressed to the valve body 79, and the valve 72 connects the pressure chamber 21 and the passage 126.

The pressure of the compressed air which is spouted from the compressor 116 is regulated by the pressure regulating portion 112 in a state that the charge adapter 121 is mounted to the sleeve 138, and the compressed air can be filled into the pressure chamber 21 through the air hose 120 and the charge adapter 121.

The base portion 20 of the driver 10 can mount and demount the charge adapter 121, and has a dedicated structure for mounting the charge adapter 121. In other words, the charge adapter 121 is mountable to and demountable from the base portion 20, and has a dedicated structure for being mounted to the base portion 20.

The dedicated structure of the base portion 20 includes the inner diameter of the mounting hole 75, the inner diameter of the female thread portion 76, the pitches the female thread portion 76, the inclination direction of the female thread portion 76 and so on. The dedicated structure of the charge adapter 121 includes the outer diameter of the connecting portion 124, an outer diameter of the male thread portion 129, pitches of the male thread portion 129, an inclination direction of the male thread portion 129 and so on. Therefore, the pressure Po of the pressure chamber 21 can be reliably set to the set pressure Pa.

Figure 10:
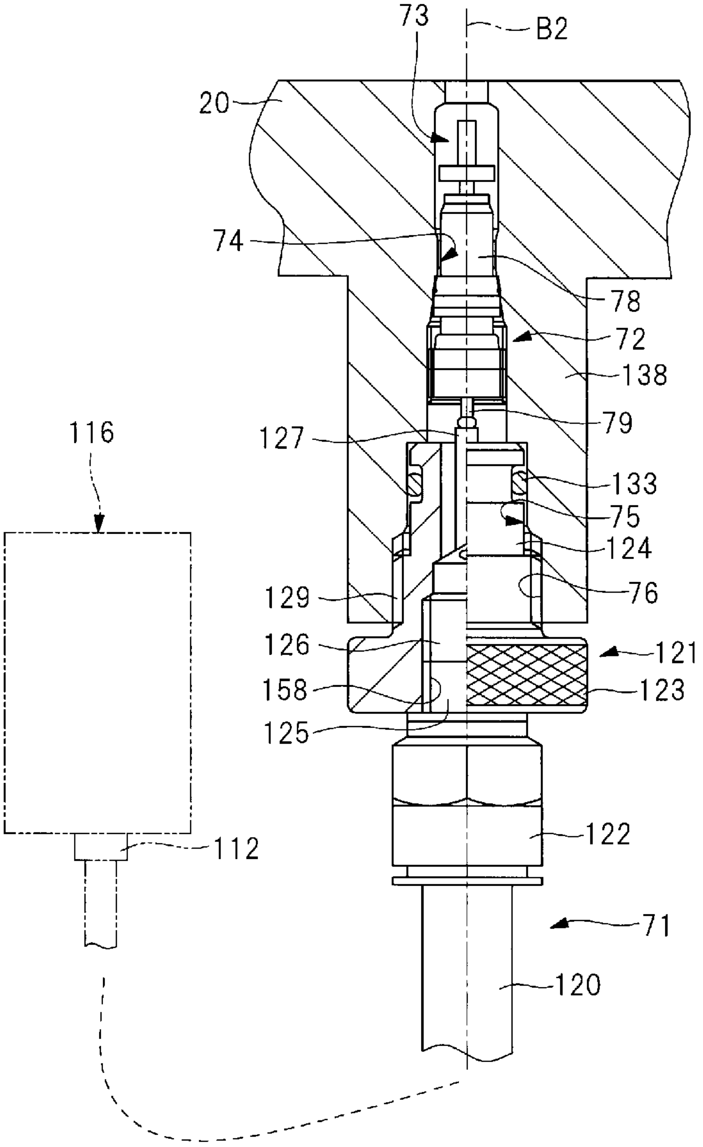
FIG. 10 is a cross-section view showing another example of a charge adapter used in embodiment 2 of the pressure regulator.

(Another example of the charge adapter) Another example of the charge adapter 121 is shown in FIG. 10. In the charge adapter 121 shown in FIG. 10, an O-ring 133 serving as a sealing member is mounted on the outer peripheral surface of the connecting portion 124. The O-ring 133 touches an inner surface of the mounting hole 75 to form a sealing surface. Therefore, the compressed air in the pressure chamber 21 can be prevented from leaking from the mounting hole 75. Other configurations of FIG. 10 are the same as the configurations of FIG. 9. In the pressure regulator 71 of FIG. 10, configuration parts that are the same as the pressure regulator 71 of FIG. 9 can obtain the same effect as the pressure regulator 71 of FIG. 9.

Figure 11:
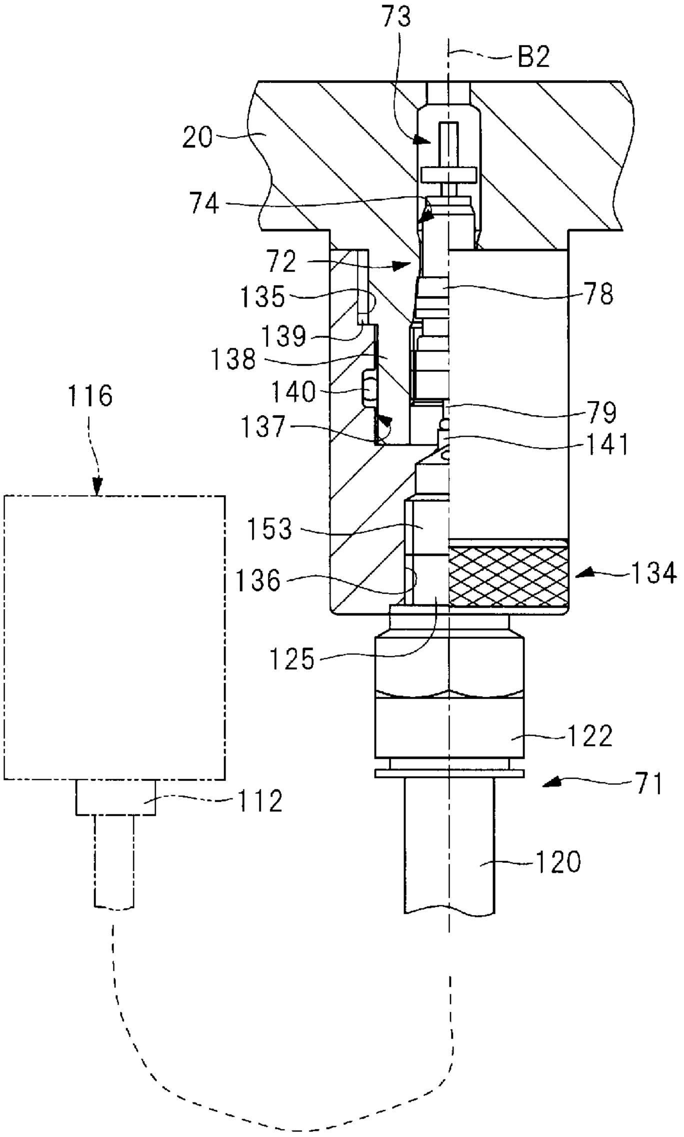
FIG. 11 is a cross-section view showing another example of the charge adapter used in embodiment 2 of the pressure regulator.

(Another example of the charge adapter) Another example of the charge adapter is shown in FIG. 11. A charge adapter 134 shown in FIG. 11 is cylindrical shaped, and the charge adapter 134 has a holding hole 137. The holding hole 137 is provided centering on the central line B2. The holding hole 137 is linked to a passage 153, and the passage 153 is linked to the air hose 120. A female thread portion 135 is provided on an inner surface of the holding hole 137, and a female thread portion 136 is provided on an inner surface of the passage 153. The female thread portions 135, 136 are disposed in positions different from each other in the direction of the central line B2. The male thread portion 125 is screwed into the female thread portion 136, and the coupler 122 is mountable to and demountable from the charge adapter 134.

The base portion 20 has the sleeve 138, and the valve accommodation portion 74 is provided on the sleeve 138. A male thread portion 139 is provided on an outer surface of the sleeve 138. The male thread portion 139 is screwed into the female thread portion 135 to tighten the charge adapter 134, and the charge adapter 134 is fixed to the sleeve 138. An O-ring 140 serving as a sealing member is mounted on an inner peripheral surface of the holding hole 137. The O-ring 140 touches an outer peripheral surface of the sleeve 138 to form a sealing surface.

A protrusion 141 is provided within the holding hole 137 of the charge adapter 134. When the charge adapter 134 is fixed to the sleeve 138, the protrusion 141 is pressed to the valve body 79, and the valve 72 connects the pressure chamber 21 and the passage 153. The coupler 122 is connected to the charge adapter 134, and the air hose 120 is linked with the passage 153.

The O-ring 140 prevents the compressed air in the holding hole 137 from leaking to the outside of the charge adapter 134. A configuration of the pressure regulator 71 of FIG. 11 is the same as the configuration of the pressure regulator 71 of FIG. 9. In the pressure regulator 71 of FIG. 11, configuration parts that are the same as the pressure regulator 71 of FIG. 9 can obtain the same effect as the pressure regulator 71 of FIG. 9.

In addition, when the charge adapter 134 is mounted to the sleeve 138, the valve 72 connects the pressure chamber 21 and the passage 153. Therefore, the compressed air supplied from the compressor 116 can be filled into the pressure chamber 21. The charge adapter 134 can be rotated, and the charge adapter 134 can be demounted from the sleeve 138. When the charge adapter 134 is demounted from the sleeve 138, the protrusion 141 is separated from the valve body 79, and the valve 72 disconnects the pressure chamber 21 and the passage 153.

Figure 12:
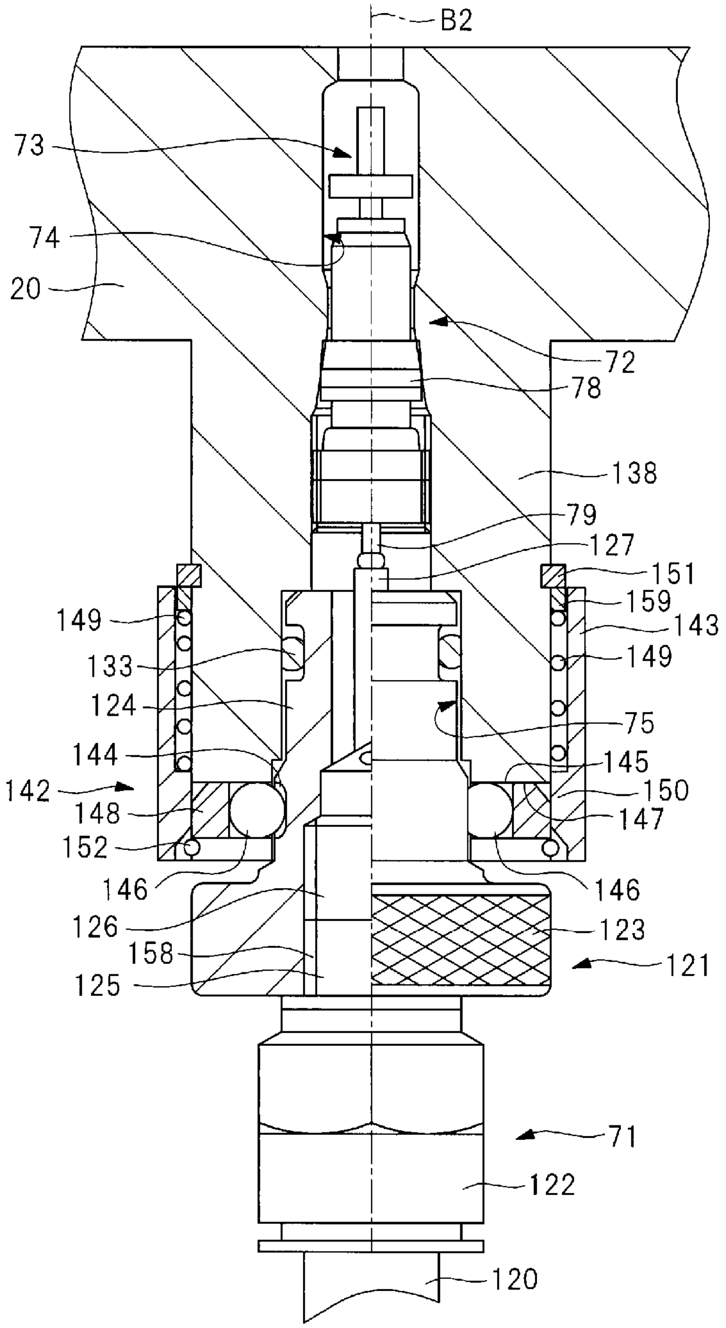
FIG. 12 is a cross-section view showing another example of the charge adapter used in embodiment 2 of the pressure regulator.

(Another example of the charge adapter) Another example of the charge adapter 121 is shown in FIG. 12. In configurations shown in FIG. 12, configurations that are the same as the configurations shown in FIG. 10 are shown by the same symbols as in FIG. 10. No female thread portion is provided on the inner surface of the mounting hole 75, and no male thread portion is provided on an outer surface of the connecting portion 124. Concave portions 144 are provided on the outer surface of the connecting portion 124. A plurality of concave portions 144 are spaced apart in a circumferential direction of the connecting portion 124. In addition, the O-ring 133 is mounted on the outer surface of the connecting portion 124.

The sleeve 138 has a circular groove 147 and holding holes 145 penetrating the sleeve 138 in the radial direction. A plurality of holding holes 145 are spaced apart in the circumferential direction. The holding holes 145 penetrate a bottom surface of the circular groove 147.

A mounting mechanism 142 which mounts the charge adapter 121 to the sleeve 138 is provided. The mounting mechanism 142 has a cylindrical shaped slide cover 143, steel balls 146 disposed in the holding holes 145, a ring 148 disposed in the circular groove 147, and a spring 149 energizing the slide cover 143.

The slide cover 143 is disposed concentrically with the sleeve 138 on an outer side of the sleeve 138. A circular convex portion 150 is provided on an inner peripheral surface of the slide cover 143. An inner diameter of the convex portion 150 is larger than an outer diameter of the sleeve 138, and the slide cover 143 is movable with respect to the sleeve 138 in the direction of the central line B2.

Retaining rings 151, 152 are mounted on the outer surface of the sleeve 138. The retaining rings 151, 152 are spaced apart in the direction of the central line B2. The retaining rings 151, 152 do not move with respect to the sleeve 138 in the direction of the central line B2. The circular groove 147 is disposed between the retaining ring 151 and the retaining ring 152 in the direction of the central line B2. The spring 149 is disposed between an inner surface of the slide cover 143 and the outer surface of the sleeve 138. A circular washer 159 is disposed between the inner surface of the slide cover 143 and the outer surface of the sleeve 138. The spring 149 is disposed between the convex portion 150 and the retaining ring 151. An outer diameter of the retaining ring 152 is larger than an inner diameter of the convex portion 150. The spring 149 is a compression spring, and the spring 149 is pressed to the retaining ring 151 with the washer 159 there-between. The ring 148 is made of metal or synthetic resin, and is arc shaped with a cut in one place in a circumferential direction. The ring 148 is a spring stretchable in the circumferential direction and the radial direction.

As shown in FIG. 12, in the state that the charge adapter 121 is mounted to the sleeve 138 of the base portion 20, the convex portion 150 which is pressed by an energizing force of the spring 149 is pressed to the retaining ring 152, and the slide cover 143 is positioned with respect to the sleeve 138. The ring 148 is disposed on an inner side of the slide cover 143 in a state that the ring 148 is compressed in the circumferential direction and the radial direction. One portion of the steel balls 146 is positioned in the concave portions 144, and the steel balls 146 cannot move in the radial direction. Other configurations shown in FIG. 12 are the same as the configurations shown in FIG. 10.

The connecting portion 124 is positioned within the mounting hole 75, and the steel balls 146 are engaged with the sleeve 138 and the connecting portion 124, by which the charge adapter 121 is positioned and fixed with respect to the sleeve 138 in the direction of the central line B2. When the charge adapter 121 is fixed to the sleeve 138, the pushrod 127 is pressed to the valve body 79, and the valve 72 connects the pressure chamber 21 and the passage 126. Therefore, the compressed air supplied from the compressor 116 is filled into the pressure chamber 21 through the air hose 120 and the passage 126. The O-ring 133 touches the inner surface of the mounting hole 75 to form the sealing surface. The O-ring 133 prevents the compressed air from leaking between the mounting hole 75 and the connecting portion 124.

Figure 13:
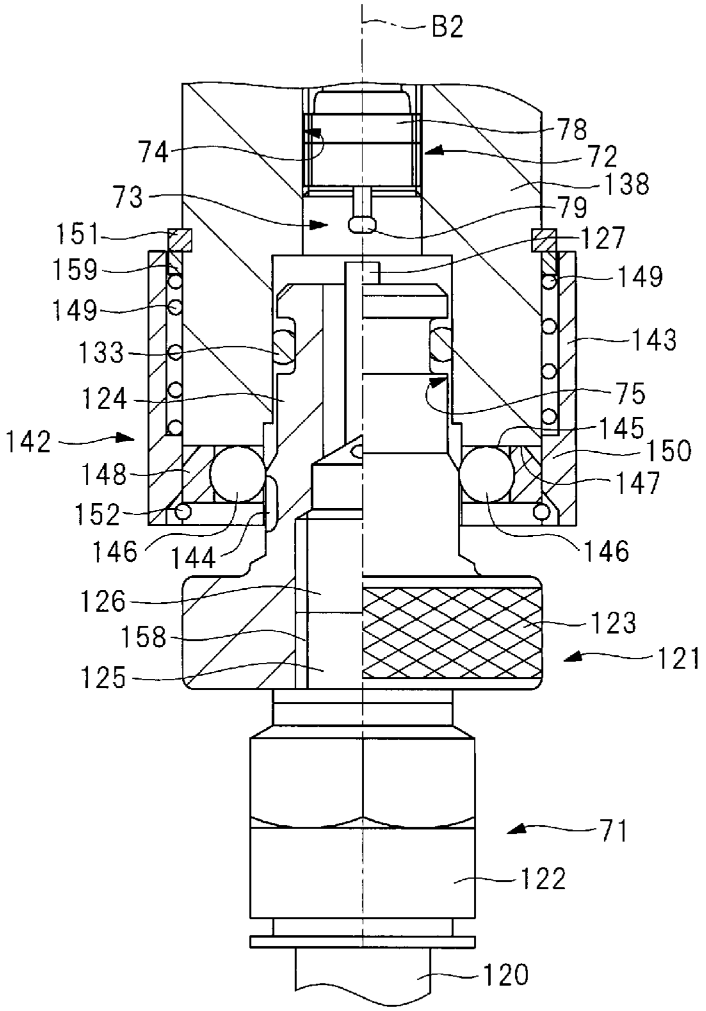
FIG. 13 is a cross-section view showing another example of the charge adapter used in embodiment 2 of the pressure regulator.

The operation of mounting the charge adapter 121 to the sleeve 138 is described with reference to FIG. 13 and FIG. 12. As shown in FIG. 13, when the charge adapter 121 is not mounted to the sleeve 138, the pushrod 127 is separated from the valve body 79. The valve 72 disconnects the pressure chamber 21 and the mounting hole 75.

When the operator inserts the connecting portion 124 into the mounting hole 75, the steel balls 146 touch the outer surface of the connecting portion 124 and roll. The steel balls 146 move along a surface shape of the connecting portion 124 and in a radial direction of the connecting portion 124, push and expand the ring 148 outward in the radial direction. Besides, when the one portion of the steel balls 146 enters the concave portions 144 as shown in FIG. 12, the charge adapter 121 is positioned and fixed to the sleeve 138.

Figure 14:
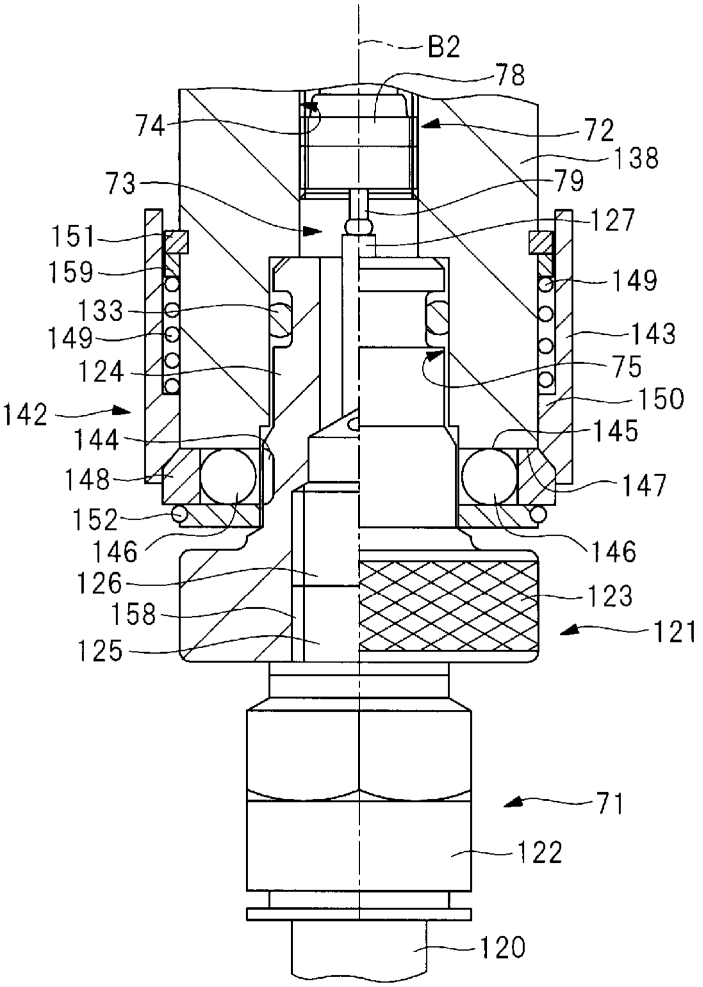
FIG. 14 is a cross-section view showing another example of a charge adapter used in embodiment 2 of a pressure regulator.

The operation of demounting the charge adapter 121 from the sleeve 138 is described with reference to FIG. 12 and FIG. 14. In the state that the charge adapter 121 is mounted to the sleeve 138 as shown in FIG. 12, the operator grasps the slide cover 143 by hands. The slide cover 143 is moved in the direction of the central line B2 against the energizing force of the spring 149 as shown in FIG. 14. That is, the slide cover 143 approaches the knob portion 81. Then, as shown in FIG. 14, the ring 148 expands outward in the radial direction under an elastic restoring force.

Besides, when the operator grasps the knob portion 81 and pulls the charge adapter 121, the steel balls 146 move outward in a radial direction of the sleeve 138, and an engaging force between the steel balls 146 and the connecting portion 124 disappears. Therefore, the charge adapter 121 can be demounted from the sleeve 138.

Figure 15:
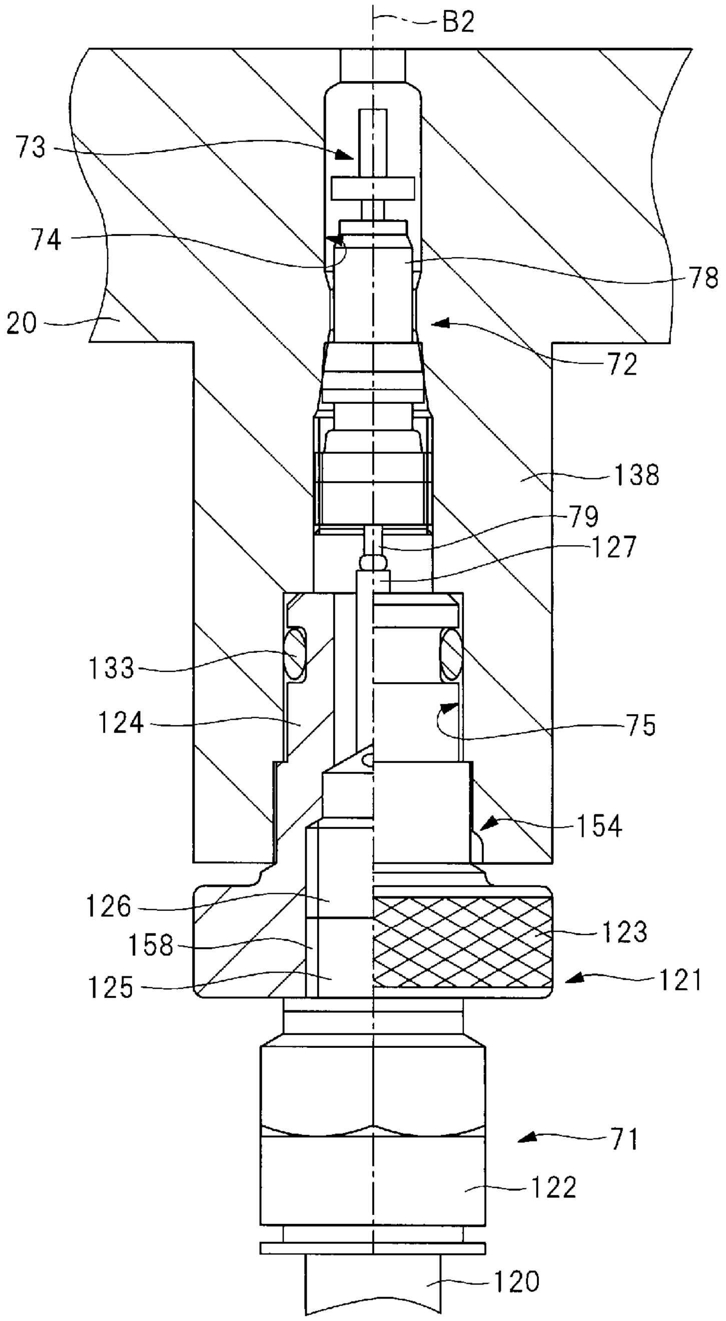
FIG. 15 is a cross-section view showing another example of the charge adapter used in embodiment 2 of the pressure regulator.
Figure 16:
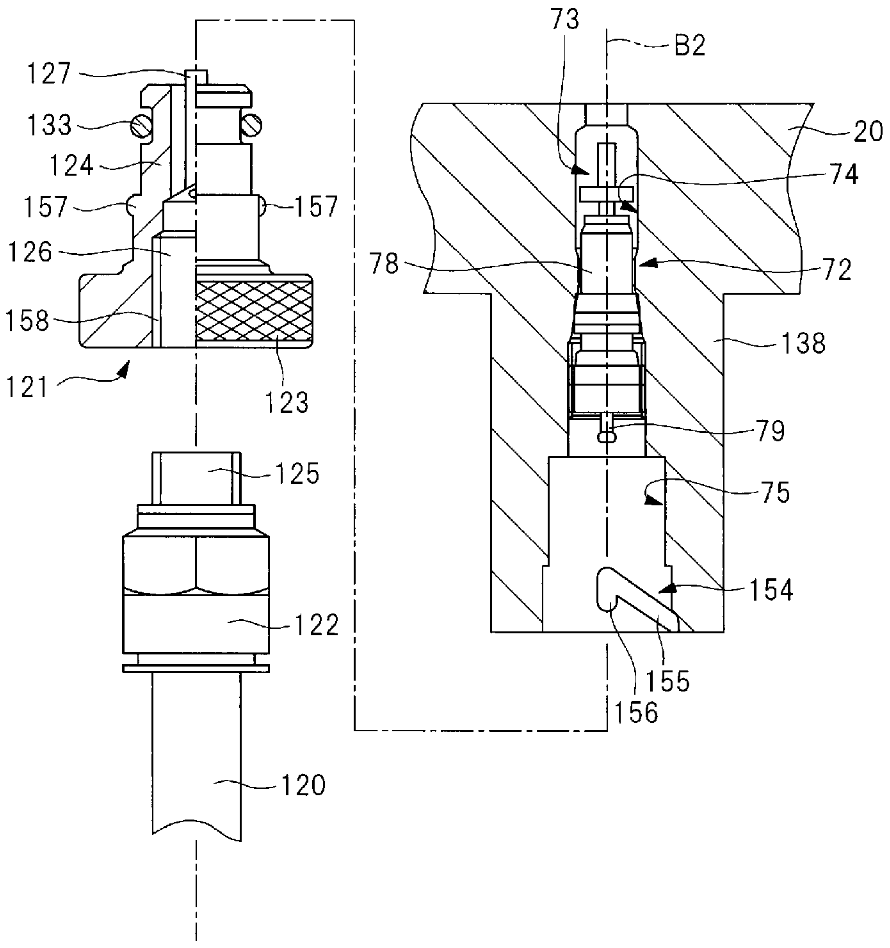
FIG. 16 is a cross-section view of a state in which the charge adapter shown in FIG. 15 is demounted from a sleeve.

(Another example of the charge adapter) Another example of the charge adapter 121 is shown in FIG. 15 and FIG. 16. In configurations shown in FIG. 15 and FIG. 16, the configurations that are the same as the configurations shown in FIG. 10 are shown by the same symbols as in FIG. 10. A guide groove 154 is provided on the inner surface of the mounting hole 75, and no female thread is provided on the inner surface of the mounting hole 75. The guide groove 154 has an inclined portion 155 that is provided in a range of 90 degrees in a circumferential direction of the mounting hole 75, and a straight portion 156 that is linked with the inclined portion 155 and extends in the direction of the central line B2. The inclined portion 155 inclines with respect to the central line B2, and is linked to an opening end of the mounting hole 75. A protrusion 157 is provided on a surface of the connecting portion 124. The protrusion 157 is disposed between the O-ring 133 and the knob portion 123 in the direction of the central line B2.

As shown in FIG. 15, the connecting portion 124 is disposed in the mounting hole 75, the protrusion 157 is disposed on the straight portion 156 of the guide groove 154, and the charge adapter 121 is mounted to the sleeve 138. The protrusion 157 is engaged with the sleeve 138, thereby preventing the connecting portion 124 from falling off from the mounting hole 75. When the charge adapter 121 is mounted to the sleeve 138, the pushrod 127 is pressed to the valve body 79. The valve 72 connects the pressure chamber 21 and the passage 126.

The O-ring 133 prevents the compressed air from leaking between the sleeve 138 and the connecting portion 124. The compressed air supplied from the compressor 116 is filled into the pressure chamber 21 through the air hose 120, the passage 126 and the valve 72. Other effects of the charge adapter 121 of FIG. 15 are the same as the effects of the charge adapter 121 shown in FIG. 10.

The operation of mounting the charge adapter 121 to the sleeve 138 is described. The connecting portion 124 of the charge adapter 121 is inserted into the mounting hole 75, and the protrusion 157 is inserted into the inclined portion 155. Besides, while the charge adapter 121 is rotated, the charge adapter 121 approaches the sleeve 138. Besides, when the protrusion 157 is made to enter the straight portion 156 and the charge adapter 121 is stopped, the charge adapter 121 is mounted to the sleeve 138.

The operation of demounting the charge adapter 121 from the sleeve 138 is described. The charge adapter 121 shown in FIG. 15 approaches the valve 72, and then the charge adapter 121 is rotated and separated from the valve 72. Then, the protrusion 157 moves along the inclined portion 155, and the charge adapter 121 can be demounted from the sleeve 138.

Figure 17:
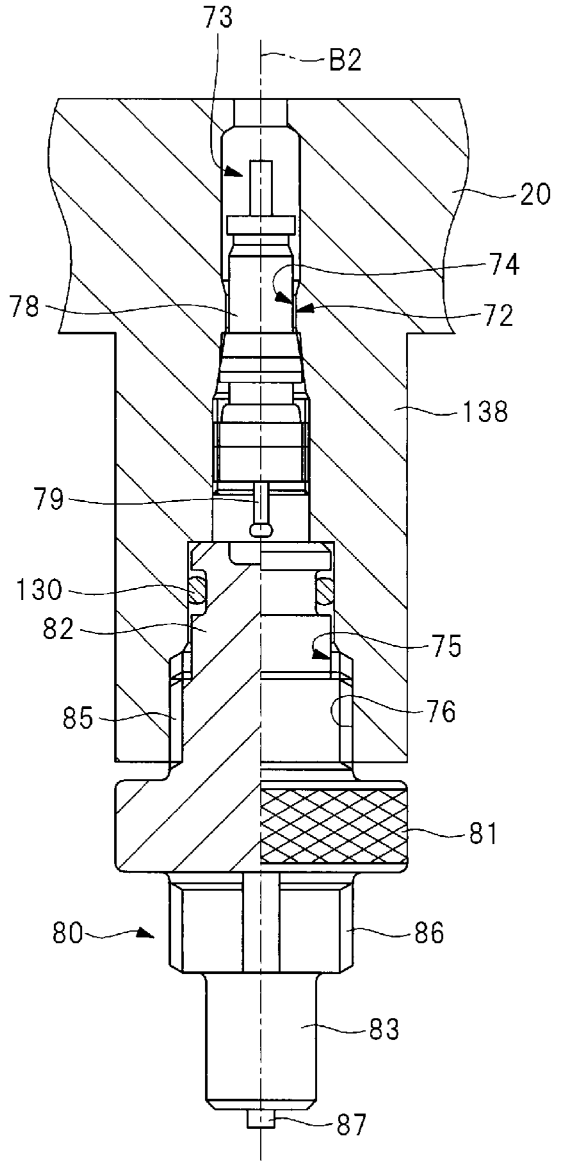
FIG. 17 is a cross-section view showing another example of the cap.
Figure 18:
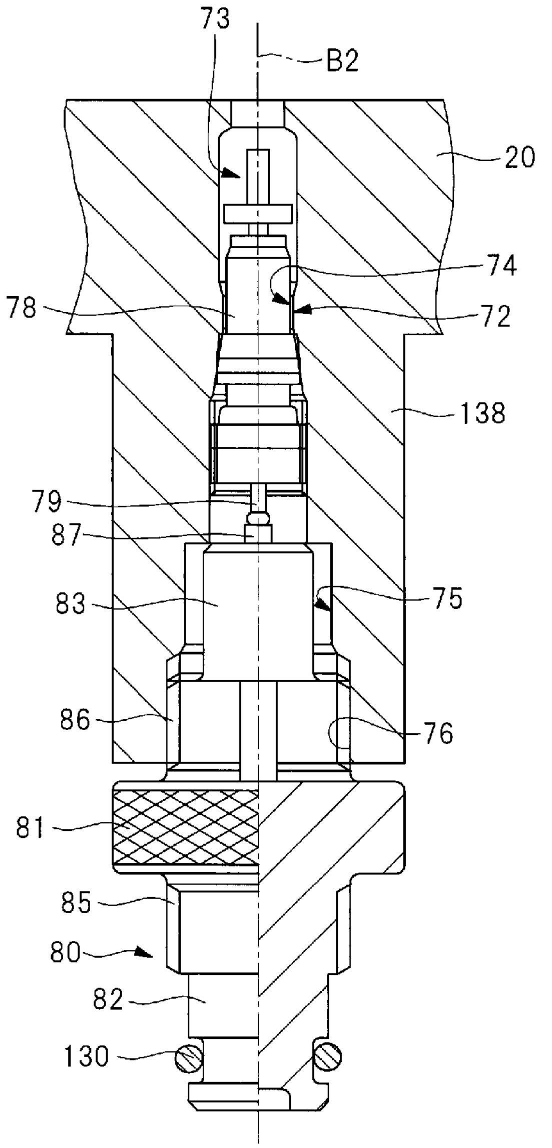
FIG. 18 is a cross-section view in which a mounting state of the cap shown in FIG. 17 is changed.

(Another example of cap) FIG. 17 and FIG. 18 show another example of the cap 80. The O-ring 130 is mounted as the sealing member on an outer peripheral surface of the connecting portion 82. The connecting portion 82 shown in FIG. 17 and FIG. 18 does not include the taper portion 77 of FIG. 2. The connecting portion 82 shown in FIG. 17 and FIG. 18 does not include the concave portion 89 of FIG. 2. In addition, the base portion 20 shown in FIG. 17 and FIG. 18 does not include the taper portion 77 shown in FIG. 2 and FIG. 3.

Regarding the cap 80, when the male thread portion 85 is screwed into the female thread portion 76 as shown in FIG. 17, the cap 80 can be fixed to the base portion 20 in the first state. When the cap 80 is fixed to the base portion 20 in the first state, the valve body 79 is not subject to external force, and the valve 72 disconnects the pressure chamber 21 and the mounting hole 75. In addition, the O-ring 130 touches the inner surface of the mounting hole 75 to form the sealing surface. Therefore, the compressed air in the pressure chamber 21 can be prevented from leaking from the mounting hole 75.

Regarding the cap 80, when the male thread portion 86 is screwed into the female thread portion 76 as shown in FIG. 18, and the cap 80 is fixed to the base portion 20 in the second state, the protrusion 87 pushes the valve body 79, and the valve 72 connects the pressure chamber 21 and the mounting hole 75. In addition, the O-ring 130 is positioned outside the mounting hole 75, and the sealing surface is not formed. Therefore, the compressed air in the pressure chamber 21 is discharged to the interior A1 of the housing 11 shown in FIG. 1 through the valve 72 and the mounting hole 75.

The housing 11 of the embodiment has an opening portion and a cover closing the opening portion. The hands of the operator and objects can enter and leave the interior A1 of the housing 11 by demounting the cover. That is, an operation of mounting the cap 80 to and demounting the cap 80 from the base portion 20, an operation of mounting the pressure regulator 71 to and demounting the pressure regulator 71 from the base portion 20, and an operation of mounting the charge adapter 121 to and demounting the charge adapter 121 from the base portion 20 can be performed.

In the description of meanings of matters of the disclosure, the electric motor 43 is a motor, the pin wheel 35 is a rotation member, the pinions 40 are first engagement portions, the convex portions 42 are second engagement portions, the mounting hole 75 is a mounting portion, the housing 11 is an outer shell member, the charge adapters 121, 134 are connecting portions, and the air hoses 113, 120 are gas conveying pipes. The passage 96 is a first passage, the passage 95 is a second passage, and the port 101 is a third passage.

The driver is not limited to the embodiments, and various changes can be made in a range not departing from the spirit of the present invention. For example, in addition to the pressure regulating valve that adjusts the energizing force of the spring applied to the valve body and changes pressure of gas, the pressure regulating portion includes an electromagnetic valve that applies an energizing force of a spring and an electromagnetic force to the valve body. The electromagnetic valve can adjust the pressure of the gas filled into the pressure chamber by adjusting the electromagnetic force. In addition to the compressor, the gas supplying source that is connected to the driver via the pressure regulator includes a gas bomb. The pressure chamber can also be formed in an interior of a bellows. On this occasion, a striker is connected to an end portion of the bellows, and when the striker moves, the bellows stretches.

In addition to the pinions and convex portions, the moving mechanism that moves a piston in the second direction includes a cam mechanism. In addition, gears can also be used instead of the pinions. Furthermore, the moving mechanism includes a pulley, a wire and an electric motor. The wire is wound in the pulley, and the wire is linked to the piston. Then, when the wire is dragged by a rotating force of the electric motor, the piston acts by a dragging force of the wire and moves in the second direction.

Furthermore, the embodiment of the electric motor includes a direct-current motor which uses a battery serving as a direct-current power source, and an alternating-current motor which uses an alternating-current power source. The striker may be any shape such as a shaft shape, a blade shape and so on. In addition to a nail with a shaft shape, the stopper includes a U-shaped stopper. A driven material to which the stopper is driven may be any one of wood, plaster board and so on. The electric motor may be any one of a brush motor or a brushless motor. The motor is a power source generating a rotating force, and in addition to electric motor, the motor includes a hydraulic motor, an air pressure motor and an engine.

The embodiments of the driving unit include the following characteristics. A cap which is mountable to and demountable from the mounting hole is provided. When the connecting portion is demounted from the mounting hole, the cap is mounted to the mounting hole. The cap has the first state and the second state as the state of being mounted to the mounting hole. When the cap is mounted to the mounting hole in the first state, the valve disconnects the pressure chamber and the mounting hole. When the cap is mounted to the mounting hole in the second state, the valve connects the pressure chamber and the mounting hole.

What is claimed is:

1. A driver, comprising:

a cylinder;

a pressure accumulation container, having an internal space in communication with an interior of the cylinder to define a pressure chamber into which gas is filled;

a striker configured to strike a stopper by moving in a first direction under pressure in the pressure chamber; and a moving mechanism configured to move the striker in a second direction opposite to the first direction so as to compress the gas of the pressure chamber;

wherein the pressure accumulation container includes a holding hole having one end opened to the internal space of the pressure accumulation container and the other end opened to an outside, wherein the holding hole comprises:

a valve accommodation portion in which a valve is disposed; and a mounting portion that is located closer to the other end of the holding hole than the valve accommodation portion; and wherein a cap is detachably mountable to the mounting portion, wherein the mounting portion is further capable of receiving an adapter for filling the gas instead of the cap, the adapter being configured to enable gas filling into the pressure chamber when present, wherein the valve is configured to have an open state and a closed state, wherein, when the cap is mounted to the mounting portion, the valve remains in the closed state and prevents communication between the inside and the outside of the pressure accumulation container, wherein the cap further seals the communication between the inside and the outside of the pressure accumulation container.

2. The driver according to claim 1, wherein when an elongated portion of the adapter is inserted into the mounting portion, the elongated portion presses a part of the valve to transition the valve from the closed state to the open state and to communicate the pressure chamber and the mounting portion, and the elongated portion seals an inside of the mounting portion and an outside, except for a passage of the adapter.

3. The driver according to claim 1, further comprising: an outer shell member, which accommodates a part of the pressure accumulation container and the cylinder;

wherein the mounting portion is provided inside the outer shell member; and wherein the outer shell member includes an opening portion that allows the user to interchange the adapter and the cap from outside the outer shell.

4. The driver according to claim 1, wherein the striker comprises: a piston, which is movably disposed within the cylinder and is subject to the pressure of the pressure chamber; and a driver blade, which is provided on the piston; and the moving mechanism comprises: a motor, which is provided inside the outer shell member; a rotation member, which is rotated by a rotating force of the motor; a plurality of first engagement portions, which are provided on the rotation member along a rotation direction; and a plurality of second engagement portions, which are provided on the driver blade along a movement direction, and are capable of being respectively engaged with and released from the plurality of first engagement portions.

5. A driving unit, comprising:

a driver; and an adapter for filling the gas to the driver;

wherein the driver comprises:

a cylinder;

a pressure accumulation container, having an internal space in communication with an interior of the cylinder to define a pressure chamber into which gas is filled;

a striker configured to move in a first direction under pressure in the pressure chamber to strike a stopper, and a moving mechanism configured to move the striker in a second direction opposite to the first direction so as to compress the gas of the pressure chamber;

wherein the driver has a mounting portion having one end connected to an inside of the pressure chamber and the other end opened to an outside;

wherein the adapter includes:

a first passage formed therein;

a second passage formed therein;

a first connection portion provided at the other end;

a second connection portion provided at the one end and detachably connected to the mounting portion;

a valve body configured to connect and disconnect the first passage and the second passage; and wherein the first connection portion is configured to receive a coupler that is detachably mounted to the first connection portion, the coupler being provided at an air hose extending from a compressor.

6. The driving unit according to claim 5, wherein the adapter further comprises a third passage which discharges the gas from the second passage, and the valve body which connects and disconnects the first passage and the second passage and connects and disconnects the second passage and the third passage;

wherein the valve body connects the first passage and the second passage and disconnects the second passage and the third passage when a pressure of the pressure chamber is below a target pressure of the pressure chamber, and the valve body disconnects the first passage and the second passage and connects the second passage and the third passage when the pressure of the pressure chamber exceeds the target pressure of the pressure chamber.

7. The driving unit according to claim 5, wherein a cap mountable to and demountable from the mounting portion is provided to seal the communication between the inside and the outside of the pressure accumulation container, and when the cap is mounted to the mounting portion in place of the adapter, the valve remains in the closed state and prevents communication between the inside and the outside of the pressure accumulation container.

8. The driver unit according to claim 5, further comprising:

a valve disposed in a valve accommodation portion located between the one end of the mounting portion and the pressure chamber when the adapter is mounted to the mounting portion, an elongated portion of the adapter presses a part of the valve to transition the valve from the closed state to the open state to communicate the pressure chamber and the mounting portion, and the elongated portion seals an inside of the mounting portion and an outside, except for the second passage of the adapter.

9. The driving unit according to claim 5, wherein the striker comprises: a piston, which is movably disposed within the cylinder and is subject to the pressure of the pressure chamber; and a driver blade, which is provided on the piston; and the moving mechanism comprises: a motor; a rotation member, which is rotated by a rotating force of the motor; a plurality of first engagement portions, which are provided on the rotation member along a rotation direction; and a plurality of second engagement portions, which are provided on the driver blade along a movement direction, and are capable of being respectively engaged with and released from the plurality of first engagement portions.

10. The driving unit according to claim 5, wherein the adapter includes a pressure regulating portion which adjusts the pressure of the gas filled into the pressure chamber, and the elongated portion integrally formed and detachably connectable to the driver as a single unit.

11. The driver according to claim 1, wherein the cap is elongated and configured to be inserted into the mounting portion, and a sealing state is formed between an inner surface of the mounting portion and an outer surface of the cap.

12. The driver according to claim 11, wherein the cap includes a concave portion formed at an end portion of the cap, and when the cap is mounted to the mounting portion, a part of the valve is positioned within the concave portion.

13. The driver according to claim 1, wherein a cap-side mounting portion of the cap and an adapter-side mounting portion of the adapter have about a same shape, and are mounted using a common mounting method.

14. The driver according to claim 13, wherein the mounting portion includes an internal female thread, the cap includes an external male thread, and the adapter includes an external male thread, wherein the cap and the adapter are selectively inserted and fixed into the mounting portion by screwing.

15. The driver according to claim 1, wherein the pressure accumulation container is integrally formed with a sleeve, which has a tubular shape and extends along an axis that passes through the internal space of the pressure accumulation container, wherein the holding hole is formed in the sleeve.

16. A driver comprising:

a cylinder;

a pressure accumulation container having an internal space communicating with an interior of the cylinder to define a pressure chamber into which gas is filled;

a striker configured to strike a stopper by moving in a first direction under pressure in the pressure chamber;

a moving mechanism configured to move the striker in a second direction opposite to the first direction so as to compress the gas of the pressure chamber;

wherein the pressure accumulation container includes a sleeve having a holding hole, the sleeve being integrally formed with the pressure accumulation container in a tubular shape and extends along an axis that passes through the internal space of the pressure accumulation container, the holding hole having one end opened to the internal space of the pressure accumulation container and the other end opened to an outside;

wherein the holding hole comprises:

a valve accommodation portion in which a valve is disposed; and a mounting portion that is aligned with the valve accommodation portion along an extending direction of the sleeve, is located closer to the other end than the valve accommodation portion; and to which an adapter is detachably mounted.

17. The driver according to claim 16, wherein the valve is configured to have an open state and a closed state, and wherein the adapter includes an elongated portion that is insertable into the mounting portion, and wherein, when inserted into the mounting portion, the elongated portion contacts a part of the valve to transition the valve from the closed state to the open state.

18. The driver according to claim 17, wherein the valve comprising: a valve core; a valve body configured to move relative to the valve core in one direction to open the valve, and move relative to the valve core in another direction to close the valve; and wherein the valve body moves along the axis of the sleeve.

19. The driver according to claim 16, wherein a sealing member disposed between the inner peripheral portion of the mounting portion and the outer peripheral portion of the elongated portion, when the elongated portion of the adapter is inserted into the mounting portion, the sealing member is compressed to seal the mounting portion and the outside.

20. The driver according to claim 16, wherein the mounting portion includes an internal female thread, the elongated portion of the adapter includes an external male thread, and the elongated portion of the adapter is inserted and fixed into the mounting portion by screwing.

* * * * *